(12) United States Patent
Müller et al.

(10) Patent No.: US 7,010,845 B2
(45) Date of Patent: Mar. 14, 2006

(54) METHOD OF MAKING A JOINT BETWEEN TWO COMPONENTS

(75) Inventors: Rudolf Müller, Frankfurt am Main (DE); Michael Vieth, Bad Vilbel (DE); Hans Broich, Gröbenzell (DE); Jiri Babej, Lich (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 0 days.

(21) Appl. No.: 10/625,274

(22) Filed: Jul. 23, 2003

(65) Prior Publication Data

US 2005/0097722 A1 May 12, 2005

Related U.S. Application Data

(63) Continuation of application No. 09/647,607, filed as application No. PCT/EP99/02236 on Apr. 1, 1999, now abandoned.

(30) Foreign Application Priority Data

Apr. 6, 1998 (DE) .......................................... 198 15 407

(51) Int. Cl.
  *B23P 11/00* (2006.01)
  *B21D 39/00* (2006.01)

(52) U.S. Cl. ......................... 29/512; 29/509; 29/525.05; 29/525.06; 29/525.13; 29/897; 411/546; 403/168; 403/280

(58) Field of Classification Search ................... 29/897, 29/897.2, 505, 509, 512, 525.01, 525.05, 29/283.5, 525.02, 525.06, 525.11, 525.13, 29/897.3, 897.312; 403/280, 167, 168; 411/546, 411/181; 52/508, 506.5, 787.1, 787.12, 801.11
See application file for complete search history.

(56) References Cited

U.S. PATENT DOCUMENTS 2,562,336 A * 7/1951 Selden ........................ 411/501
2,767,877 A * 10/1956 Newsom ..................... 403/167

(Continued)

FOREIGN PATENT DOCUMENTS

DE 2353913 2/1974
DE 2844384 C2 4/1980

(Continued)

*Primary Examiner*—Eric Compton
(74) *Attorney, Agent, or Firm*—Greenberg Traurig LLP; Eugene C. Rzucidlo

(57) ABSTRACT

A first and second component joint includes using a fastener having a first end, and a flange having a diameter greater than a tubular barrel portion. A second end having a second tubular barrel portion merges into a shoulder of a flange part having a greater diameter than the barrel portion. The first tubular barrel portion is deformed radially outwardly sandwiching the first component between the flange and the first barrel portion. The second end of the fastener is introduced through a hole in the second component by applying the second component to the first component so the shoulder of the flanged part abuts the second component spacing the second component from the first component. The fastener device is fastened to the second component by deforming the second tubular barrel portion radially outwardly sandwiching the second component between the shoulder and the tubular barrel portion.

6 Claims, 17 Drawing Sheets

Figure 1:
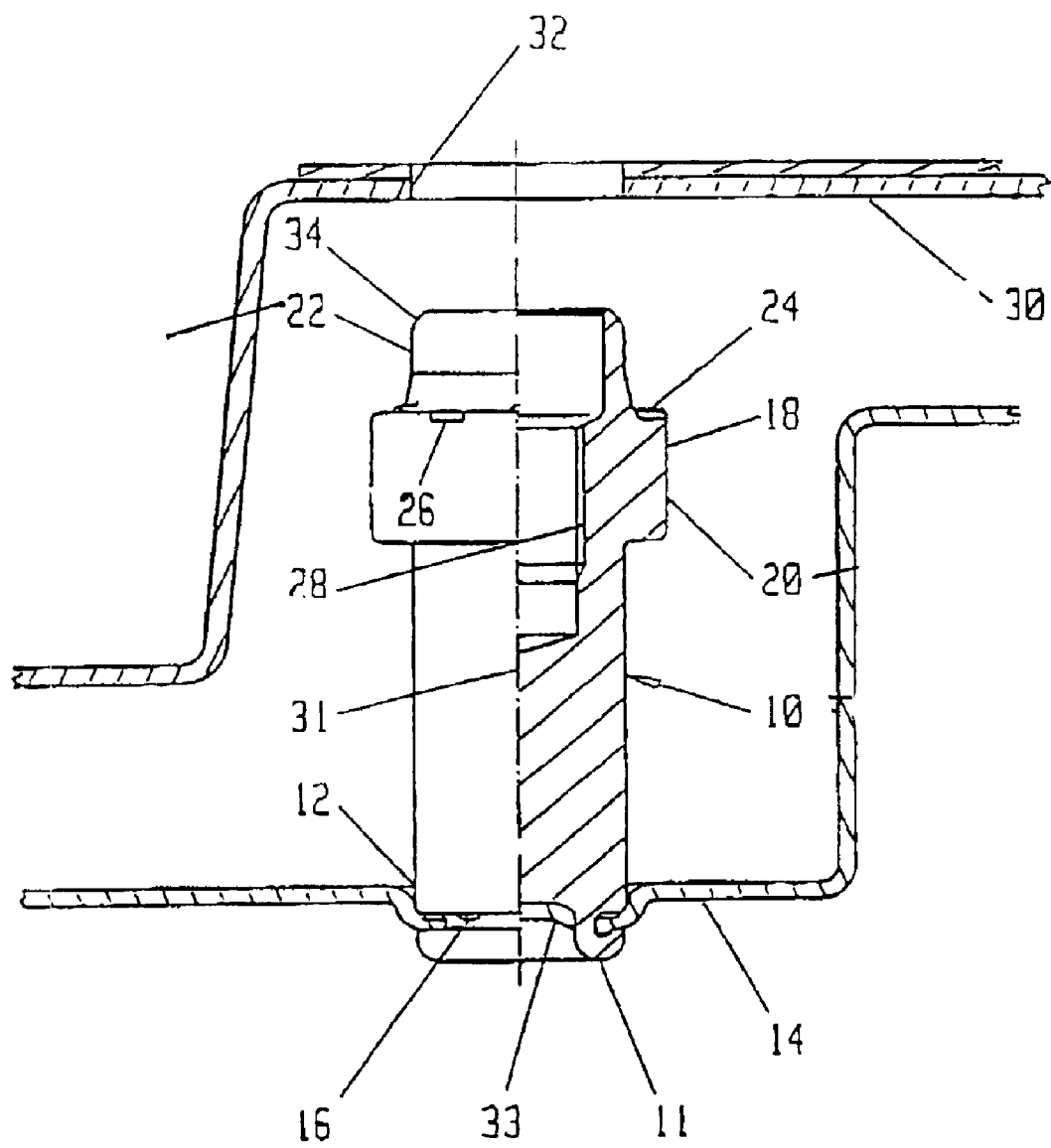

U.S. PATENT DOCUMENTS 3,563,183 A * 2/1971 Rich ..................... 108/57.31
4,118,855 A * 10/1978 Lequeux ..................... 29/447
4,650,274 A    3/1987 Schmid ..................... 339/263
5,528,812 A * 6/1996 Muller ..................... 29/432.2

FOREIGN PATENT DOCUMENTS

| | | |
|---|---|---|
| DE | 3019070 A1 | 5/1981 |
| DE | 3042772 C2 | 7/1981 |
| DE | 3404118 C2 | 8/1985 |
| DE | 3446978 C2 | 8/1985 |
| DE | 3815502 * | 11/1989 |
| DE | 3835556 A1 | 4/1990 |
| EP | 0663247 A1 | 12/1994 |
| EP | 0669473 A1 | 2/1995 |
| EP | 0759510 A1 | 2/1997 |
| EP | 0842733 A2 | 5/1998 |
| EP | 0540330 B1 | 9/1998 |
| WO | WO9319890 | 10/1993 |
| WO | WO9951886 | 10/1999 |

* cited by examiner

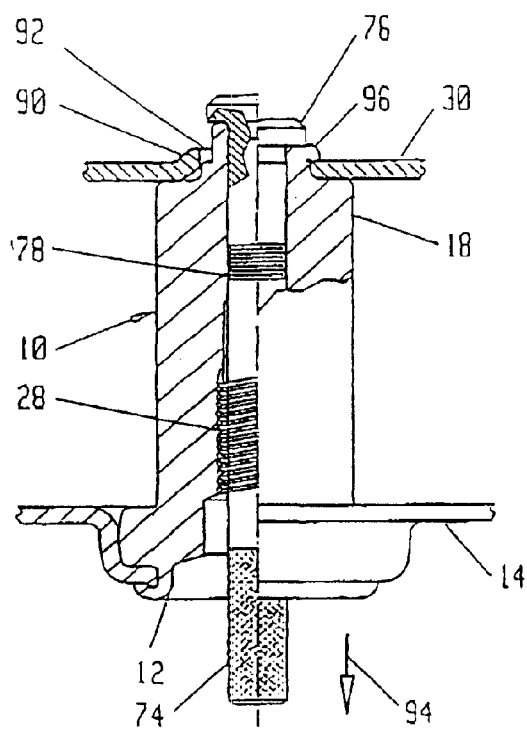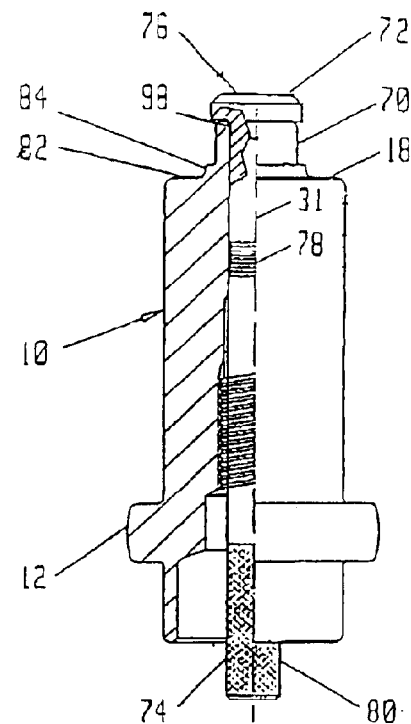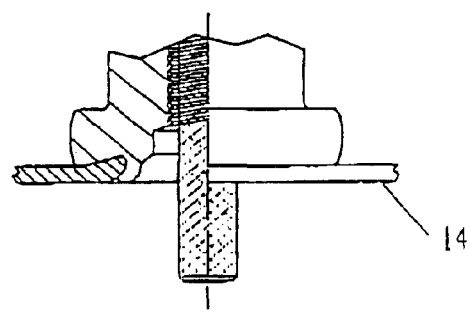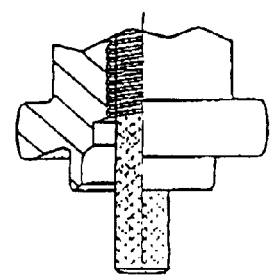

METHOD OF MAKING A JOINT BETWEEN TWO COMPONENTS

This application is a continuation of U.S. patent application Ser. No. 09/647,607 filed Jan. 4, 2001, now abandoned, which is a 371 of PCT Application No. PCT/EP99/02236 filed Apr. 1, 1999, and to German Patent Application No. 198 15 407.0 filed Apr. 6, 1998.

The present invention relates to a fastener device which is or can be fixed at its one end to a first component by means of a joint which can be produced by a forming technique, preferably a riveted joint, and which has a receiving area configured or configurable to receive a bolt, a nut or another element, for example a bayonet part or a shaft. The present invention further relates to a combination of such a fastener device with one, two or three components and to a method of making a joint between a first and a second component while utilizing such a fastener device.

A fastener device of the kind initially mentioned is known from a number of publications. European Patent 0 539 793, for example, discloses a nut element which can be introduced in a form-locked and force-transmitting manner into a component, in particular into a sheet metal part, by means of a method termed clamping hole riveting. Piercing bolts are also known from German patents P 30 03 908 and P 34 47 006 which can be inserted in a self-piercing manner into a component in the form of a sheet metal part, with the features of shape, which form the so-called piercing and riveting section of the bolt element, being provided on the side of the head remote from the shaft part of the bolt element, so that after the bolt element has been inserted into a component from one side, the shaft part of the bolt element extends away from the sheet metal part on this side.

Bolt elements are also known which can be inserted into a pre-punched component and can be fastened to the component in the region directly below the head of the bolt element by means of a joint which can be made by a forming technique. Such bolt elements are described, for example, in German Patent Application P 44 10 475. However, they can also be executed in a self-piercing design such as is set forth in the applicant's German Patent Application 195 35 537.7. With such so-called EBF bolts or self-piercing EBF bolts, once the joint to the component has been made, the head of the bolt element is arranged on the one side of the component and the shaft part with thread is located on the other side of the component.

Generally, all elements from the product range of Profil Verbindungstechnik GmbH & Co. KG, i.e. RND, RSN, HI, RSF, RSK, UM, RSU and FUN nut elements as well as EBF, SBK and SBF bolt elements, are suitable for the present invention. Almost all fastener elements which are known in the prior art for forming a joint by a forming technique to a component or a sheet metal part can also be used without any problem for the purposes of the present invention.

The preamble of claim 1 of the present application, which relates to a fastener device, basically covers all such fastener elements.

Reference is made to the following German patents and patent applications with respect to further information on the different fastener elements from the Profil company which are suitable for use in the present invention and with respect to the methods of manufacture and insertion which can be used: P 34 04 118, P 30 03 908, P 34 46 978, P 34 47 006, P 35 24 306, P 36 10 675, P 38 35 566, P 34 48 219, P 42 14 717, P 35 83 663, P 42 31 715, P 34 39 583, P 689 08 903, P 691 01 491, P 44 10 475, P 42 11 278, P 42 11 276, P 43 10 953, P 44 20 426, P 44 29 737, 196 00 290.7, 195 35 537, 195 30 466, P 44 40 620, 196 47 831 and P 29 47 179.2. A number of various other industrial property rights of Profil Verbindungstechnik GmbH & Co. KG could also be named here.

All the above fastener elements are fastener elements which can be inserted into a sheet metal part, or optionally into a plurality of sheet metal parts contacting one another, and which then permit the screwing on of a further sheet metal part. The screwing on is carried out by means of a bolt or a nut which is screwed into or onto a fastener element made as a nut element or as a bolt respectively.

There is an increasing need in the sheet metal processing industry, but also in other industries, to screw a highly loaded component such as a mounting for an axle or a door hinge of an automobile to another component, for example a hollow section made up of a plurality of sheet metal parts, in such a way that an extremely stable attachment results. Such stable attachments can only be achieved for the production of such hollow parts with a greater amount of effort, particularly in view of the trend towards thin sheet metals.

One possibility to improve the stability of the mounting is to insert a spacer tube between two components spaced from one another and to achieve the screw connection via the spacer tube. The two sheet metal parts coupled via the spacer tube reinforce one another in this way. Furthermore, movements of the spacer tube with respect to the one or the other sheet metal part are suppressed by the attachment of the spacer tube at both ends, which is of benefit to the stability of the connection to the screw-on part.

Such spacer tube connections, see, for example, DE C 39 36 376, have, however, previously only been realized using welding processes. However, this produces the disadvantage that the positional accuracy of the metal sheets relative to one another is very low and the, as a rule, high dynamic permanent stresses cannot be borne without difficulty by the welded joints. Furthermore, the heat development during a welding process is not compatible with the strength requirements when high-strength, alloyed metal sheets are used.

It is the object of the present invention to provide a fastener device which can be used without difficulty in conventional sheet metal working, which can be realized at low cost and which allows a very stable attachment of a third component to a composite part comprising the first and second components and the fastener device.

In order to satisfy this object there is provided, in accordance with the invention, a fastener device of the kind named initially which is characterized in that it is configured in a region spaced from the first said end for attachment onto or into a second component. The spaced region can be provided in this arrangement at the end of the fastener device opposite the first said end. It can, however, also be at the center of the fastener device so that the other end of the fastener device projects beyond the second component.

Various possibilities exist for the attachment of the fastener device to the second component in the spaced region. For example, the spaced region can advantageously be designed as a blind-rivet sleeve. It can, however, also be designed for attachment to the second component by a forming technique, with it finally also being possible, depending on the specific embodiment, to design the spaced region such that it is suitable for welding or bonding to the second component.

The fastener device can be made in one piece or in a plurality of parts. The one piece design is, on the one hand, easy to handle, but has the disadvantage that the length of the fastener device always has to be adapted to the respective purpose, which makes stock-keeping more problematic. A design using a plurality of parts, however, allows such stock-keeping problems to be coped with—for example by the two ends of the fastener device being made by fastener elements available as standard parts which can in each case be joined to the associated sheet metal part by a forming technique, while a middle part termed a spacer tube can be made in different lengths depending on the application.

Particularly preferred embodiments of the fastener device can be found in the dependent claims 2 to 25.

Special combinations of the fastener device and sheet metal parts can be found in the further claims 26 to 31.

Methods of making a joint between a first and a second component while utilizing the fastener device in accordance with the invention can be found in claims 32 to 38. The fastener devices in accordance with the present invention in particular have the following advantages:

- they permit the first and second components (sheet metal parts or moldings made of other materials) to be positioned with respect to one another with low tolerances with regard to the position and spacing of the moldings and thus form a kind of gauge during the assembly of the corresponding components;
- they serve as a nut or bolt element for the screwing on of further components with heavy operating loads;
- they serve to secure the angular position and—where required—the security against being pressed out or rotated during assembly;
- they take up operating loads, shear and pressure torque statically and dynamically in each case;
- the integrity of the fastener device is not a problem with the multiple part version either, as the screw connection can be made such that all elements of the fastener device are supported by one another.

It is of particular advantage that the shearing, tensile and compression forces as well as any torques, which have to be taken up at the end of the fastener device, can be taken up substantially better due to the length of the fastener device and the reinforcing of the structure it effects.

Figure 2:
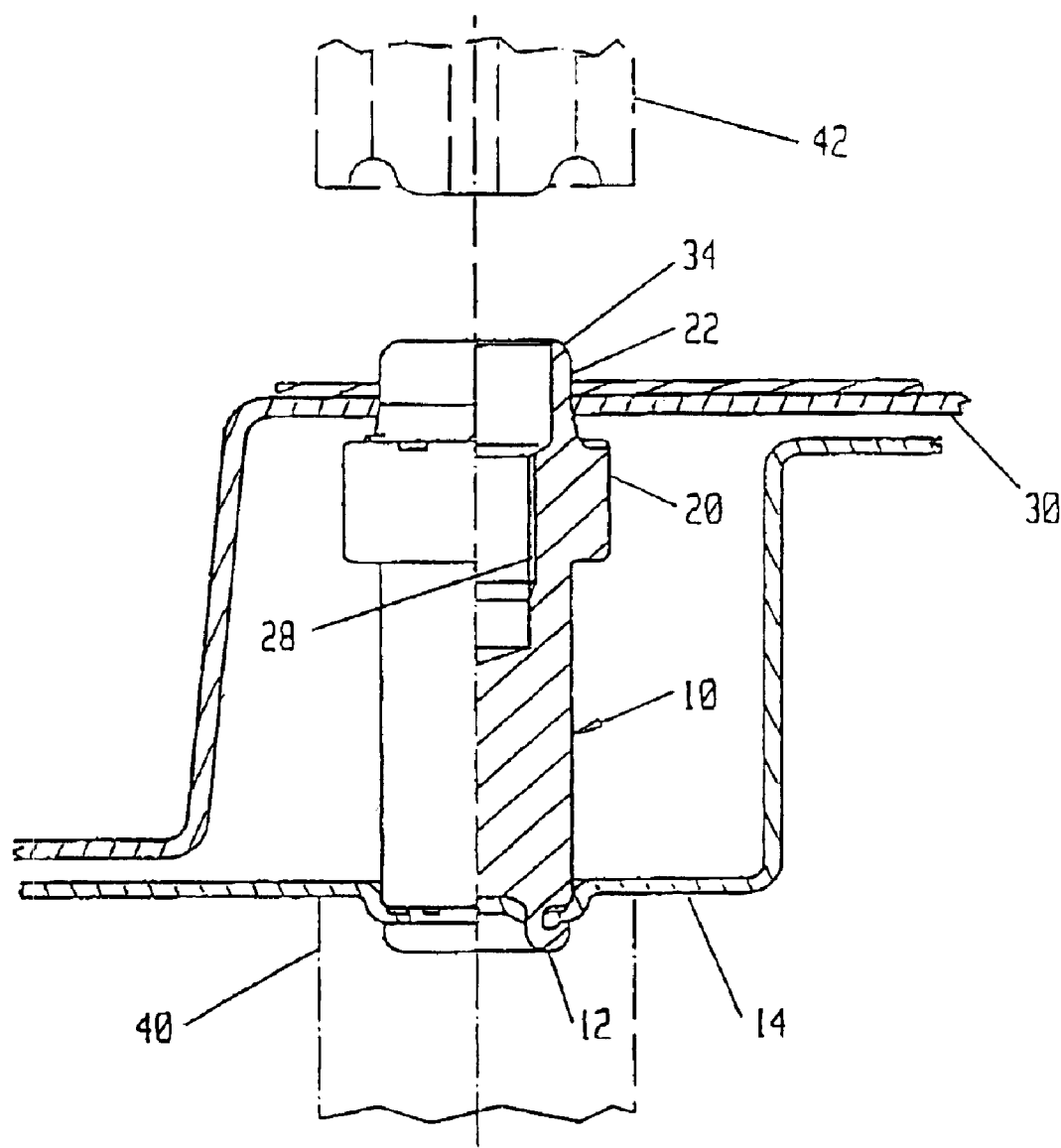
Figure 3:
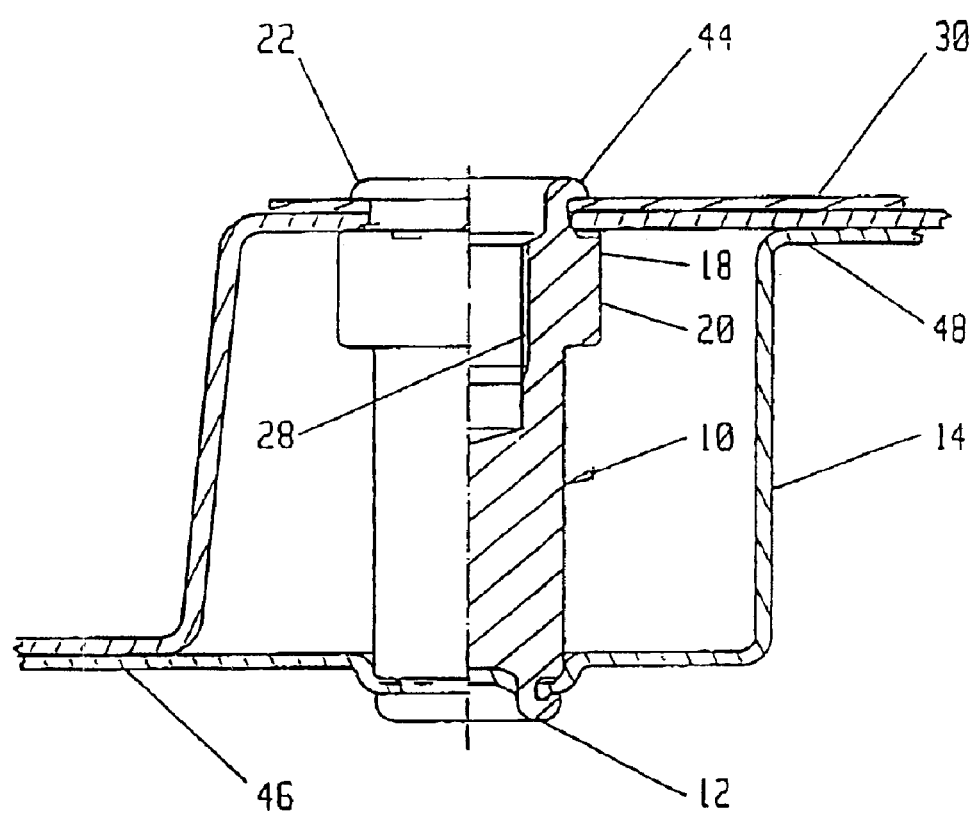
Figure 4:
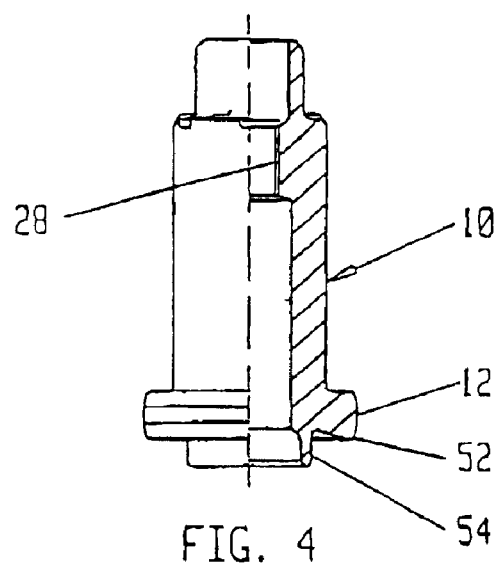
Figure 5:
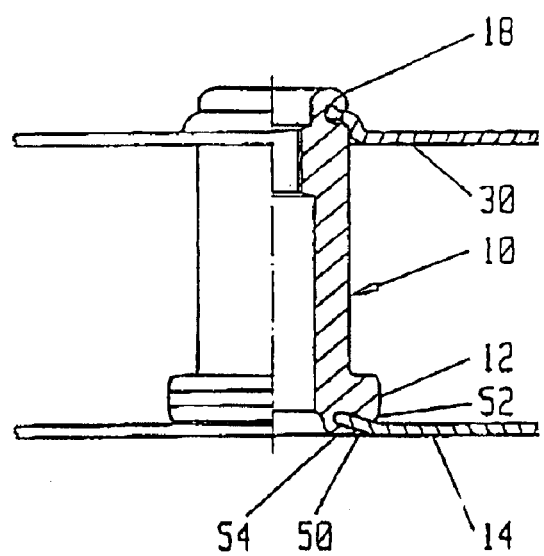
Figure 6:
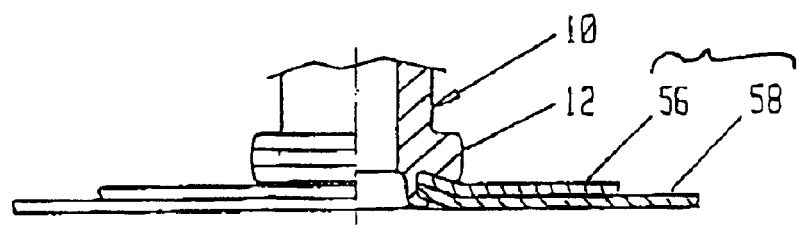
Figure 7:
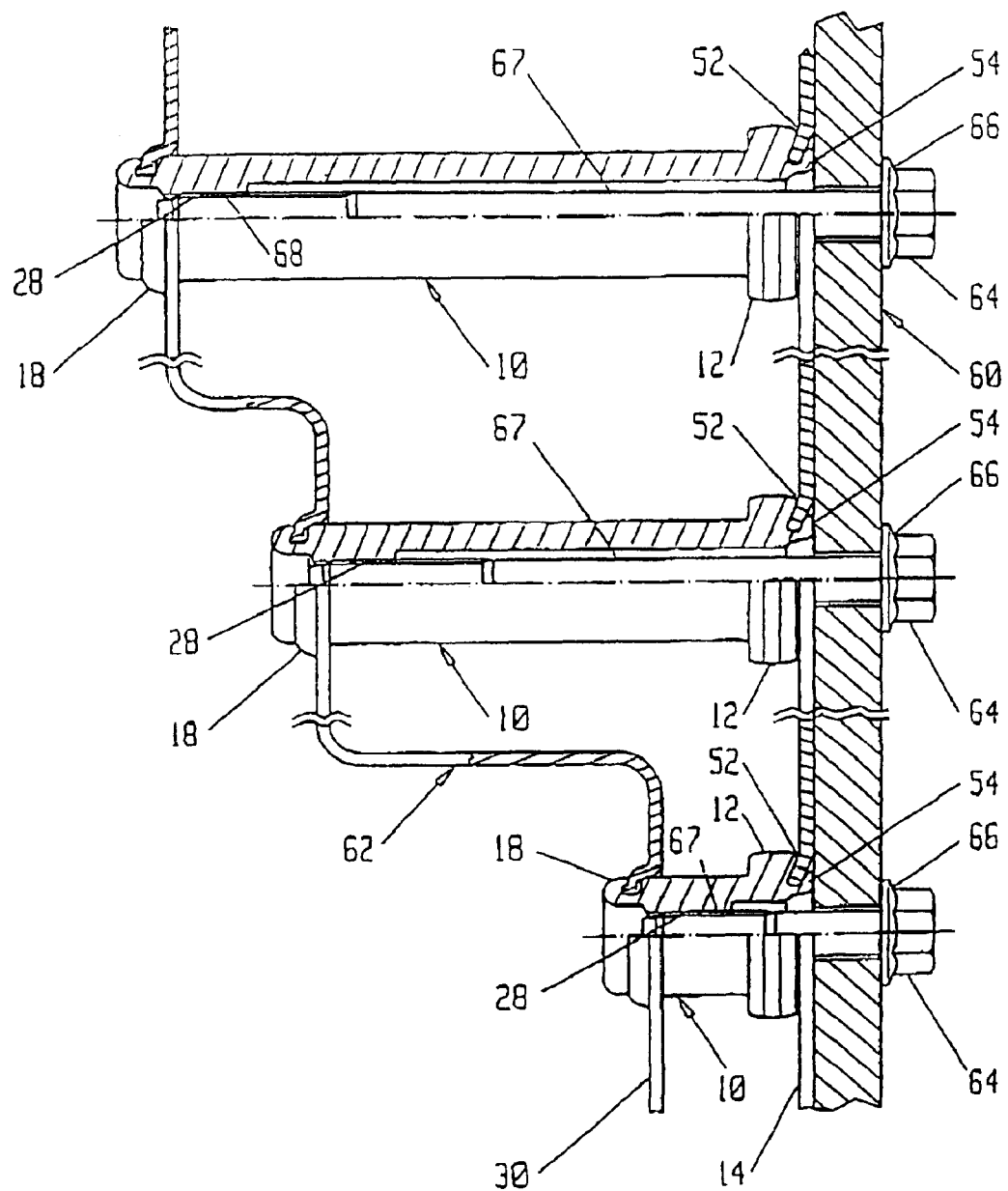

The invention will be described in more detail in the following with reference to embodiments and the drawings in which are shown:

FIG. 1 a partly sectioned view of a first embodiment of the fastener device in accordance with the invention for an application with two components made of sheet metal;

FIG. 2 the same embodiment as FIG. 1, but during the fastening of two components to one another;

FIG. 3 the completed joint between the two components of FIGS. 1 and 2;

FIG. 4 a partly sectioned longitudinal view of a second embodiment of a fastener device in accordance with the invention;

FIG. 5 a view of the fastener device of FIG. 4 partly sectioned in the longitudinal direction for an application with two components made of sheet metal;

FIG. 6 a representation similar to the lower part of FIG. 5 for an embodiment where the first component is made of two shaped sheet metal parts placed next to one another;

FIG. 7 a partly sectioned representation, similar to FIG. 5, but for three different lengths of the fastener device in accordance with the invention of FIG. 4, with the screwing on of a third component simultaneously being shown;

FIG. 8 a view partly sectioned in a longitudinal direction of a preferred embodiment in accordance with the invention of a fastener device having a blind-rivet sleeve and a blind-rivet mandrel;

FIG. 9 a representation similar to FIG. 8, but after the insertion of the fastener device in accordance with the invention between two components composed of sheet metal, with the situation prior to the tightening of the blind-rivet joint being shown on the left side and the situation after the tightening of the blind-rivet joint on the right side.

Figure 12:
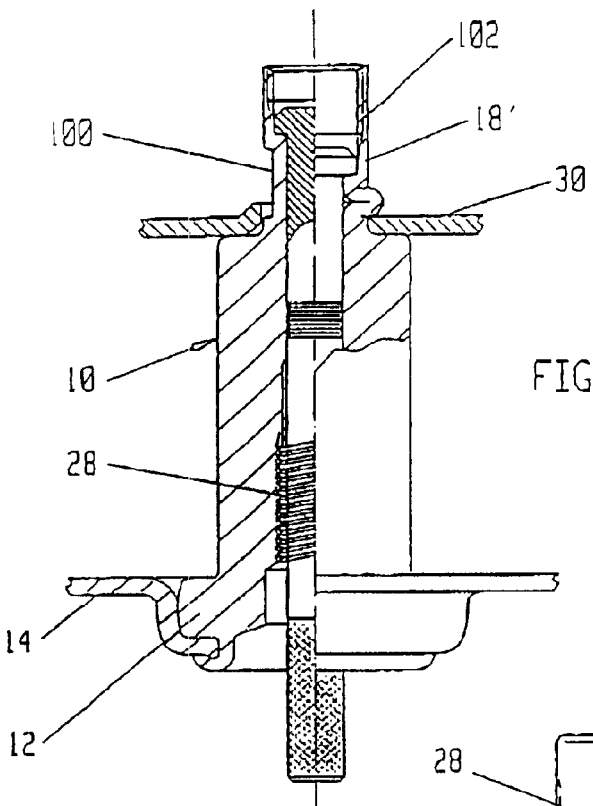
Figure 13:
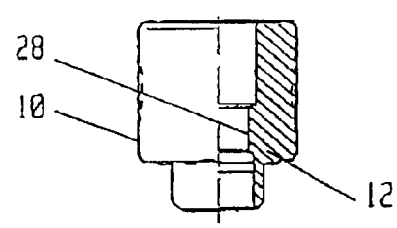
Figure 14:
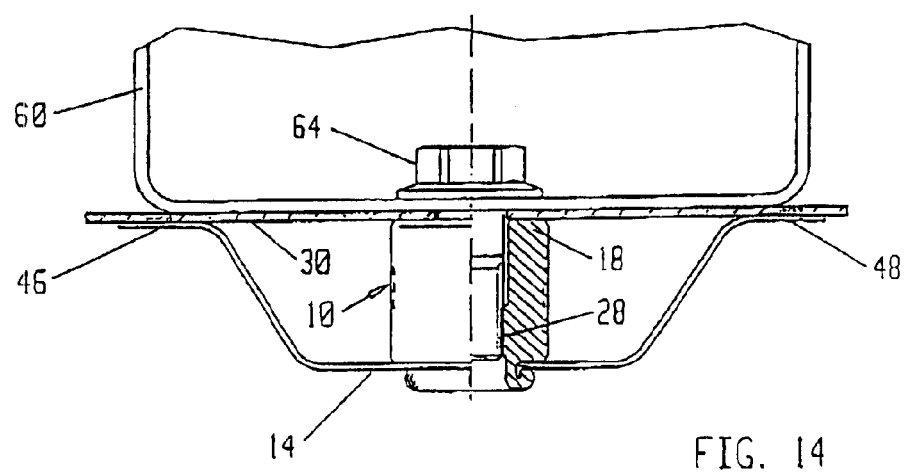
Figure 22:
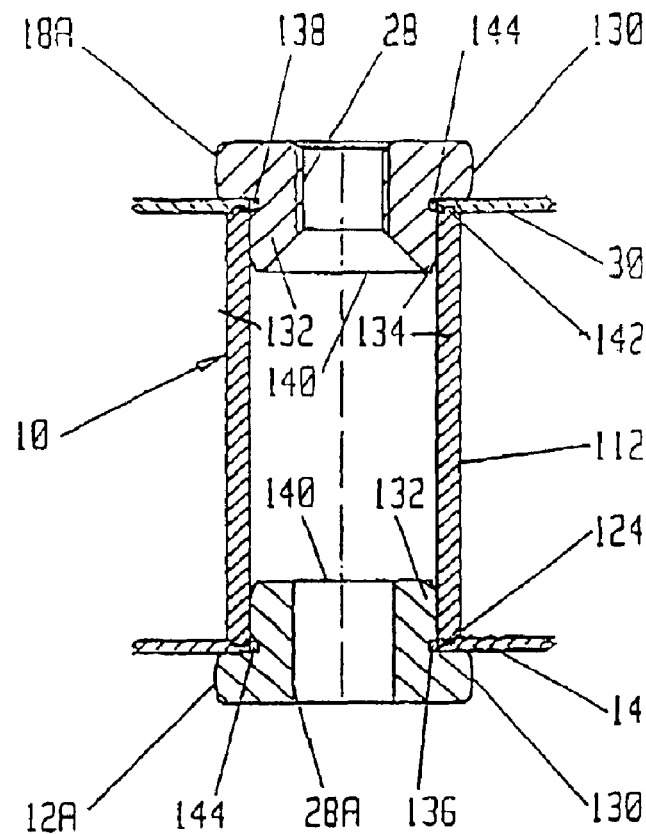
Figure 23:
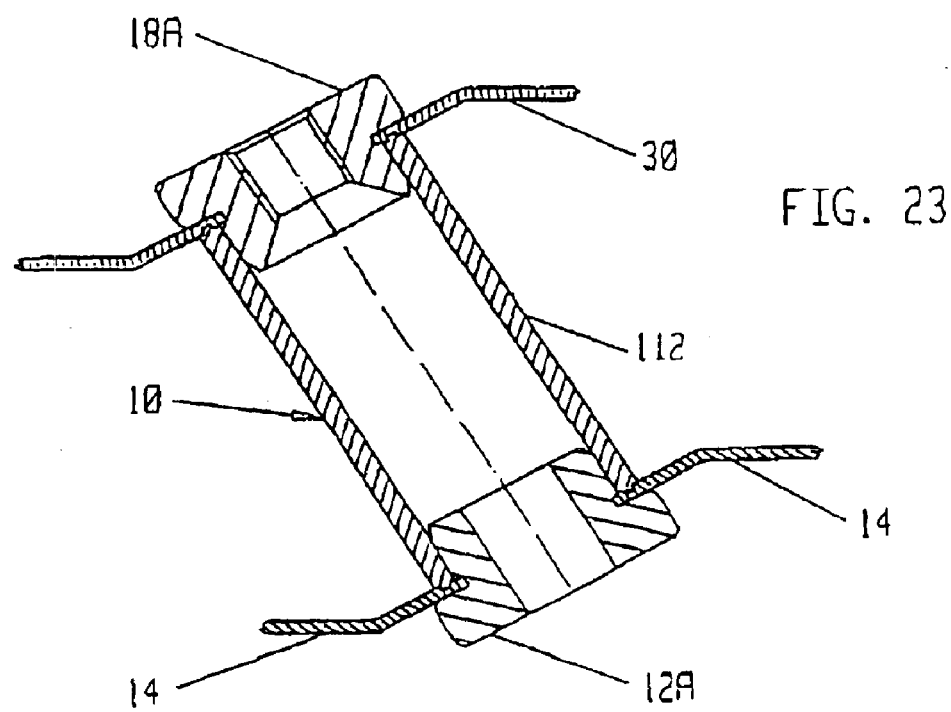
Figure 24:
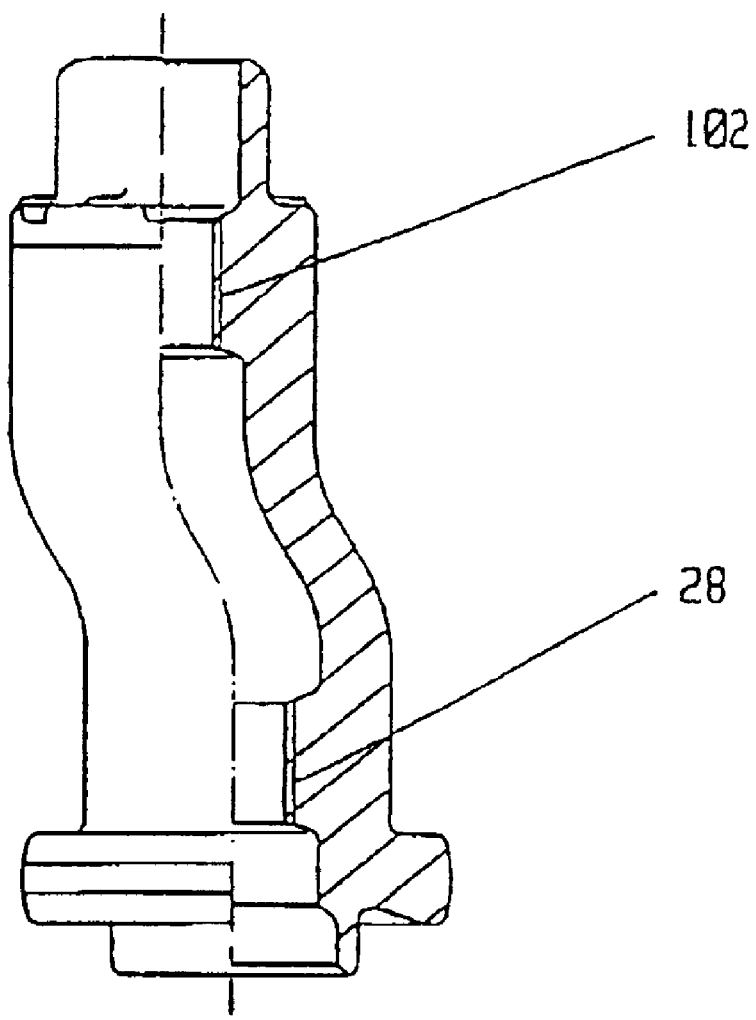

FIG. 10 a representation of the lower part of a fastener device in accordance with the invention similar to FIG. 8, but in a slightly modified embodiment;

FIG. 11 the lower part of the fastener device of FIG. 10 after insertion into a shaped sheet metal part;

FIG. 12 a slightly modified embodiment of the fastener device of FIG. 8 in a representation corresponding to FIG. 9;

FIG. 13 a view partly sectioned in a longitudinal direction of a further embodiment in accordance with the invention of a fastener device which represents the preferred embodiment;

FIG. 14 a schematic representation of the fastener device of FIG. 13 installed in two components;

FIGS. 15–21 representations similar to FIG. 7, but of modified embodiments of the fastener device in accordance with the invention;

FIG. 22 a representation sectioned in a longitudinal direction of a three-part fastener device in accordance with the invention after the insertion into two components;

FIG. 23 a representation similar to FIG. 22, but in a sloped position of the fastener device; and FIG. 24 a representation sectioned in a longitudinal direction of a further embodiment in accordance with the invention of a fastener device;

FIGS. 25A to 25D various manufacturing steps for the installation of a fastener device in accordance with the invention.

FIG. 1 first shows a fastener device 10 in accordance with the invention whose first lower end 12 is fastened to a first component 14 in the form of a shaped sheet metal part via a joint 11 which can be made by a forming technique. The joint made by a forming technique was made in this embodiment in accordance with German patent P 34 47 006. That is, the unitary fastener device 10 has a form at its lower first end corresponding to the so-called SBF (piercing bolt with flange) design of Profil Verbindungstechnik GmbH & Co. KG (hereinafter "Profil") which leads to the joint with the component 14 shown in FIG. 1 after piercing and riveting. The noses 16 extending in a radial direction and forming rotational security between the fastener device 10 and the first component 14 can also be seen from FIG. 1.

At its upper end 18 opposite the first said end 12, the fastener device of FIG. 10 has a design corresponding to the RSF nut element (round shoulder nut with flange) of Profil which is made in accordance with German patent P 36 10 675. The upper end 18 of the fastener device 10 therefore substantially has the design of a nut element with a flange part 20 and with a piercing and riveting section 22 which merges into the flange 20 via a shoulder 24 extending substantially radially, with rotational security features 26 also being provided in the region of the shoulder. A thread cylinder 28, which extends further in the direction of the central region of the fastener device 10 in this embodiment, is located within the flange part.

Although the upper end 18 of the fastener device is provided with a self-piercing design in the form of the piercing and riveting section 22, in this variant of the embodiment the piercing and riveting section is not used for piercing; instead the second component 30 also designed as a shaped sheet metal part is pre-pierced. The hole is shown at 32 and is coaxial to the longitudinal axis 31 of the fastener device 10 and to the lower joint 11 made by a forming technique to the first component 14.

There are substantially two reasons why the piercing and riveting section 22 is not used for self-piercing here. Primarily, there is a problem in that when the piercing and riveting section 22 is used to pierce the hole 32 in the component 30, the slug would close the upper end of the fastener device 10 and thus prevent access to the thread cylinder. It would, however, be possible to subsequently remove the slug. But the fastener device 10 would have to be made hollow for this purpose so that a corresponding plunger could be inserted from the lower end. This can certainly be realized. However, after the making of the form-locked joint 12, it would then first be necessary to remove the slug 33 located there.

The second reason why the piercing and riveting section 22 is not used to pierce the hole 32 here is that this self-piercing function is normally only used for metal sheet thickness of up to 2 mm. In the embodiment of FIG. 1, however, the second component 30 is made of two metal sheets on top of one another which have a total thickness of more than 2 mm. It is, however, by no means problematic that the piercing and riveting section 22 is not self-piercing. There is instead even an advantage in this respect which can be seen from a comparison of the embodiments of FIGS. 1 and 2.

The rounded drawing edge 34 of the piercing and riveting section namely serves to align the second component 30 with respect to the first component 14. As a rule, not just one fastener device 10 is provided, but rather a second or a plurality of further fastener devices which are arranged at positions spaced from one another. These can then take over the task of aligning the two components 14 and 30 with respect to one another.

FIG. 2 shows the position after the alignment of the two components 14 and 30 relative to one another and, however, also shows a die 40 which is arranged beneath the first component 14, and an upper die 42 which is arranged in the plunger of a setting head and is used to rivet the piercing and riveting section 22 to the second component 30. The exact design of this die 42 is not described here as it is actually well-known due to the familiarity of the RSF elements. The corresponding method is additionally described in detail for the RSF nut element in German patent 36 10 675.

The joint between the two components 14 and 30 and the fastener device 10 arranged therebetween has the appearance shown in FIG. 3 after the riveting of the piercing and riveting section 22 to the second component 30. It can be seen that the piercing and riveting section 22 has been formed into a peripheral rivet flange 44 by the pressing of the joint between the two dies 40 and 42.

It can also be seen that the two components 14 and 30 now touch closely at two points, namely at points 46 and 48. The structure formed in this way is now completed by the carrying out of welding at points 46 and 48. Then a third component (not shown) can be screwed to the component assembly of FIG. 3 by means of a bolt, with the thread of the bolt being screwed into the thread cylinder 28 of the fastener device 10.

The invention is further explained below by means of further embodiments, with identical parts being provided with the same reference numerals and these parts substantially only being described again if properties are of significance which differ from the properties of the corresponding parts in the embodiment in accordance with FIGS. 1, 2 and 3.

FIG. 4 shows a view partly sectioned in a longitudinal direction of a further fastener device 10 whose upper end is basically designed in accordance with the lower end of the fastener device 10 of the embodiment of FIG. 1, but only with the difference that the upper end, like the whole fastener device 10, is hollow and has a thread cylinder 28. The lower end 12 of the fastener device of FIG. 4 is made in this example in accordance with an RSN nut element of the Profil company, i.e. corresponding to a nut element in accordance with European patent 0 539 739, so that the exact design of the corresponding features of shape is not described in detail here. The nut element-like design at the lower end 12 of the fastener device 10 of FIG. 4 is made with a somewhat larger diameter, i.e. substantially corresponding to the so-called RND nut elements of the company of Profil.

The joint of the lower end 12 of the fastener device 10 to the first component 14 is shown in FIG. 5. It can be seen that the corresponding shaped sheet metal part has a conical collar 50 between the flange 52 at the lower end of the fastener device 12 and the riveting section 54 deformed by the riveting procedure, with this bent-around riveting section being planar with the lower side of the component 14 in this embodiment, in accordance with one of the advantages of the clamping hole method, which is particularly favorable during the bolting of further components to the lower side of the component 14.

When carrying out the clamping hole method, the conical collar 50 is first set somewhat steeper and then pressed flatter during the joining process, whereby a high-quality joint connection is created. The noses providing security against rotation, which are not shown here, but which are present, ensure that no rotation of the fastening device 10 occurs with respect to the sheet metal part 14 when a screw is inserted.

FIG. 5, however, also shows the joint between the upper end 18 of the fastener device 10 of FIG. 4 to the second component 30. This joint is substantially identical in design to the design at the lower end 12 of FIG. 1, but for one exception.

The sheet metal part 14 is pre-pierced during the carrying out of the clamping hole process in the lower region of the fastener device 10. After this joint has been made, i.e. at the first lower end of the fastener device 10, the second component 30 is then placed over the not yet deformed piercing and riveting section 22 of the fastener device 10 of FIG. 4 and subsequently turned over into a flange as shown in FIG. 5. As the component 30 is pre-pierced here, no slug is created, unlike the design in the lower part of FIG. 1. It would, however, easily be possible to utilize the self-piercing function of the piercing and riveting section 22 of the fastener device 10 of FIG. 1, whereby then a slug would arise which would close the upper end 18 of the fastener device 10 of FIG. 5. The slug can, however, be removed if desired via a plunger which is led through the hollow fastener device 10.

The formation of both the first joint made by a forming technique in the region of the first component 14 and the second joint made by a forming technique in the region of the second component 30 takes place in both cases in a press. Use is made of the appropriate die and the appropriate pressing plunger which are described precisely in the relevant patent applications covering the different types of fastening so that these parts are not described further here.

FIG. 6 only shows that the fastener device 10 can also be attached to a component in the region of the lower end 12 comprising two layers of sheet metal 56 and 58. The joint made by a forming technique in the region of the upper end 18 of the fastener device 10 can—if desired—also be made with two or more layers of sheet metal.

FIG. 7 now shows three fastener devices 10 designed in accordance with the fastener device 10 of FIG. 4, but having three different lengths.

For illustration purposes, all three fastener devices 10 of FIG. 7 are inserted spaced from one another into different regions of the two components 14 and 30, whereby a step-like design is created. While this design can easily be realized, it was chosen more to make clear the different lengths of the different fastener devices 10.

It can be seen that for all three fastener devices 10 of FIG. 7, the joints made by a forming technique to the respective components 14 or 30 are made at both ends 12 and 18 in exactly the same way as shown in FIG. 5.

FIG. 7, however, also shows how a third component 60 is fastened to the component assembly 62 of FIG. 7, via three screws 64 here, with the head part 66 of each bolt 64 contacting the third component 60 and the shaft part 67 extending through the third component 60, the first component 14 and partially through the fastener device 10 and the thread 68 of each bolt 64 being screwed into the thread cylinder 28 of the respective fastener device 10.

As the thread cylinder 28 is spaced relatively far away from the first component 14, relatively long screws, which can then be designed as waisted bolts, can be used for all three fastener devices 10 of FIG. 7.

The fastener devices of FIGS. 4, 5, 6 and 7 have particular advantages for the intended application. On the one hand, the annular flange 52 ensures that each fastener device 10 is precisely at right angles to the first component 14. The joint in the region of the first component is also capable of accepting shear and pressure torque statically and dynamically without problem thanks to the comparatively large diameter of the part 52. The joint in the region of the deformed riveting section 54 serves, on the one hand, for security against press-out and, on the other hand, for rotational security of the fastener device 10 with respect to the first component 14.

The riveting section 22 at the second end 18 of the fastener device 10 ensures a high-quality centering and positioning of the second component 30 with respect to the first component 14 when the second component 30 is being assembled with the first component 14. The noses providing security against rotation in the shoulder region around the piercing and riveting section 22 increase the rotational security of the joint between the fastener device and the two components. In addition, the joint in the region of the end 18 is also capable of accepting shear and pressure forces. Furthermore, a good seal is achieved for both the joint to the first component 14 made by a forming technique and for the joint to the second component 30 made by a forming technique, which can be made liquid-tight without any problem and ensures a gas-tight joint with exact tolerances. Moreover, in this case—as also with every other joint addressed in this application—a sealing adhesive can also be used if absolute gas-tightness is required.

It is easy to understand that a dynamic tilting movement of the fastener device 10 with respect to the first component 14 can be excluded by the length of the fastener device 10 and of the other joints between the two components 14 and 30 so that the joint is capable of withstanding dynamic stresses without problem. The structure has a great strength so that it is particularly suitable for the attachment of other high stiffness components, for example the component 60.

FIG. 8 shows a further embodiment in accordance with the invention of the fastener device 10, with the lower end 12 being made in accordance with the upper end 18 of the fastener device 10 of FIG. 1, i.e. in accordance with the RSF nut element of Profil. The upper end 18 of the one-piece fastener device 10 shown in FIG. 8 is, however, made as a blind-rivet sleeve 70. The fastener device 10 has a tightening mandrel 72 having a shaft part 74, a head part 76 and a position of fracture 78. The lower region of the shaft part 74 is provided with cross-knurling 80. The point of this design is to generate features of shape which avoid slippage when a drawing tool is applied. These features of shape 80 can also have any other shape which serves the given purpose.

It can be seen that the rivet sleeve 70 merges into a first shoulder 82 extending radially to the axial direction 31 of the fastener device 10, with the transition taking place via a second annular shoulder 84 whose diameter is greater than the diameter of the blind-rivet sleeve 70, but smaller than the outer diameter of the annular shoulder 82.

The fastener device 10 of FIG. 8 is first inserted in a first sheet metal part 14, with the design in the region of the lower end 12 of the fastener device 10 in FIG. 9 corresponding to the design of the corresponding lower end 12 of the fastener device 10 of FIG. 1.

The second component 30 is also pre-pierced here and, as shown on the left-hand side of FIG. 9, provided with a conical collar 90 which extends in a direction away from the first component 14. The conical collar 90 bounds a hole 92 having a diameter slightly greater than the outer diameter of the annular shoulder 84, but smaller than the outer diameter of the annular shoulder 82.

When the mandrel 74 is tightened in the direction of arrow 94 (with a simultaneous pushing away of the component 14 in the opposite direction), the head part 76 of the mandrel deforms the blind-rivet sleeve 70 into an annular flange 96 and presses the conical annular collar 90 back flat again so that a design is created as shown at the top right in FIG. 9. As soon as this position is reached, the shaft part 74 of the mandrel 72 breaks at the position of fracture 78. The lower end of the shaft part 74 shown in FIG. 9 can then be removed. It can be seen, in particular from FIG. 8, that the lower side of the head 76 of the mandrel 72 has a rounded undercut 98 in the region of the transition to the shaft part 74. When the rivet sleeve 70 is being deformed, material of the rivet sleeve is also displaced into this rounded undercut. This leads to the head part 76 of the mandrel being held in the fastener device 10 with the shaft part in a force-transmitting and/or form-locked manner above the fracture position and cannot be lost. If, for some reason, the head part of the mandrel should be removed, for example to attain access to a female thread in the upper region of the fastener device 10 of FIG. 9 (not shown in FIG. 9), then this rounded undercut 98 can be omitted.

It can be seen that the fracture position 78 is above the thread cylinder 28 in the FIG. 9 embodiment so that the rest of the mandrel does not prevent the insertion of a screw into the thread cylinder 28 from below.

FIG. 10 shows a modified version of the lower end 12 of the fastener device 10 of FIG. 8. The lower end is here made in correspondence with the lower end 12 of the fastener device 10 of FIGS. 4 and 5, with FIG. 10 showing the embodiment before the attachment of the first component 14 and FIG. 11 the position after the attachment to the first component 14.

FIG. 12 shows a version similar to FIG. 9, but of a further modification of the fastener device 10. In this case, the joint with the second component 30 is not made at the upper end of the fastener device 10, but in a region 100 spaced from the first lower end, with the upper end 18' of the fastener device 10 now protruding away from the side of the second component 30 remote from the first component 14 after the pulling up of the blind-rivet joint. This could, for example, be of advantage if the upper end 18' were fitted with a further thread cylinder 102 so that another part could be screwed on here. For example, with the embodiment of FIG. 12, the one end of a shock absorber could be screwed to the component 14 while utilizing the thread cylinder 28, while the thread cylinder 102 serves the fastening of a brake line.

FIG. 13 shows a further embodiment in accordance with the invention of a fastener device 10 which has the already described features of shape of the SBF element in the region of its lower end 12, but which is made hollow here with a thread cylinder 28—as is also shown in the FIG. 4 embodiment.

FIG. 14 shows a possible attachment of the lower end 12 to a cup-like first component 14. The upper end 18 of the fastener device 10 of FIG. 14 is then bonded to a second component 30. The two components 14 and 30 are subsequently welded to one another at the positions 46 and 48. A third component 60 is subsequently screwed to the component assembly comprising the components 14 and 30 by means of a bolt 64, with the threaded part of the bolt 64 being screwed into the thread cylinder 28 of the fastener device 10. The adhesive bonding to the second component 30 can optionally be omitted here.

Figure 15:
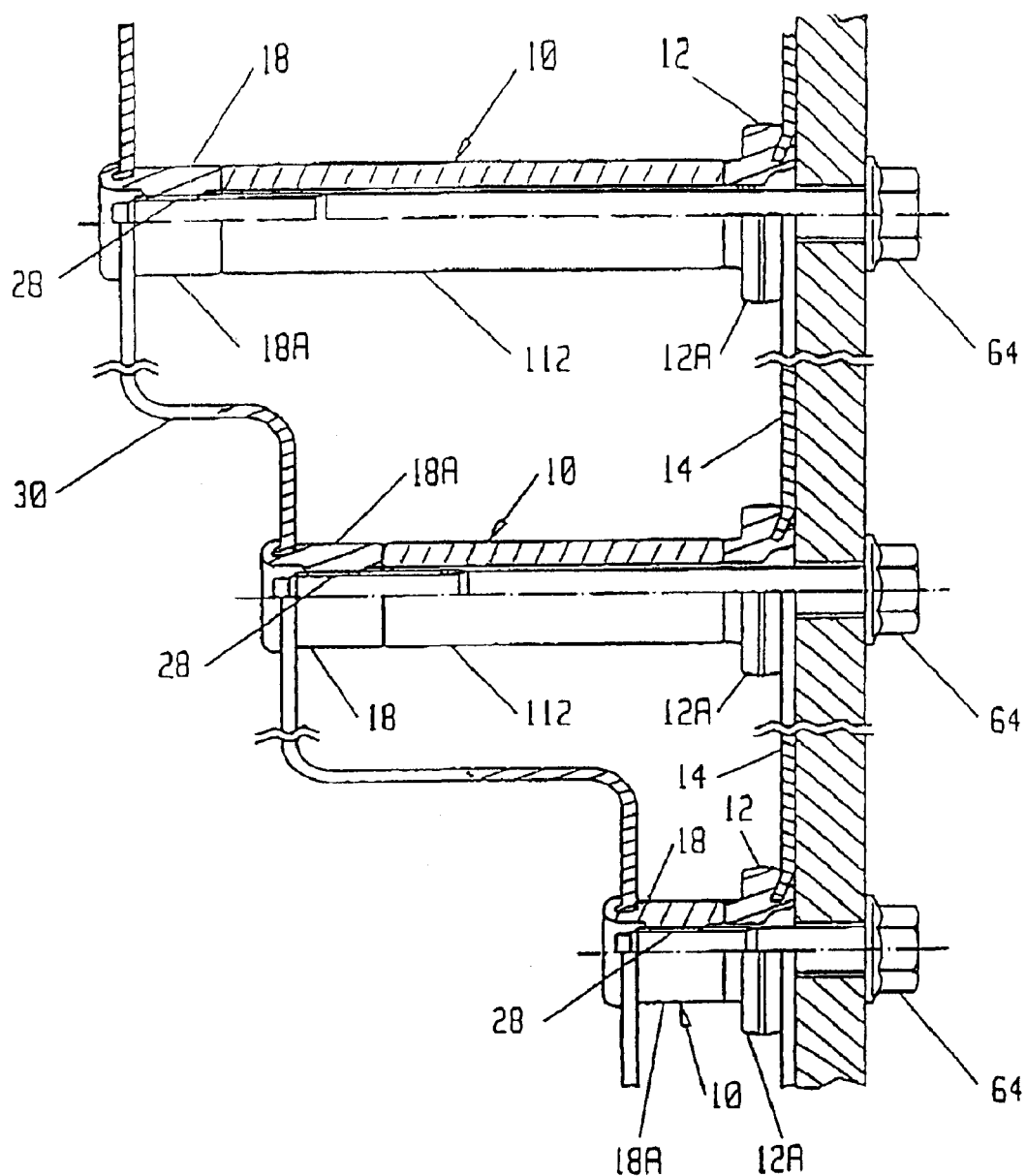

FIG. 15 shows an embodiment very similar to the embodiment in accordance with FIG. 7. Here, the fastener device 10 is made in three parts. It consists at its end 12 of an RND element 12A from Profil, at its end 18 of an RSF or SBF element 18A (realized in the case of the SBF element as a nut instead of a bolt element) and of a spacer tube 112 therebetweeen. The joint between the spacer tube 112 and the element 12A at the lower end 12 and the element 18A at the upper end 18 can be carried out, for example, by welding. The thread of the bolt 64 engages the thread cylinder in element 18A at the end 18 of the fastener device 10.

FIG. 15 shows how fastener devices 10 of different lengths can be generated by utilizing spacer tubes of different lengths, with no spacer tube at all being used with the fastener device 10 in the bottommost embodiment. The joint between the two elements 12A, 18A and the spacer tube 112 can also be made otherwise. For example, the elements and the spacer tube could be fastened to one another by an adhesive bond. This is easily sufficiently secure in some cases since all joints are loaded in compression when the screw 64 is tightened.

Figure 16:
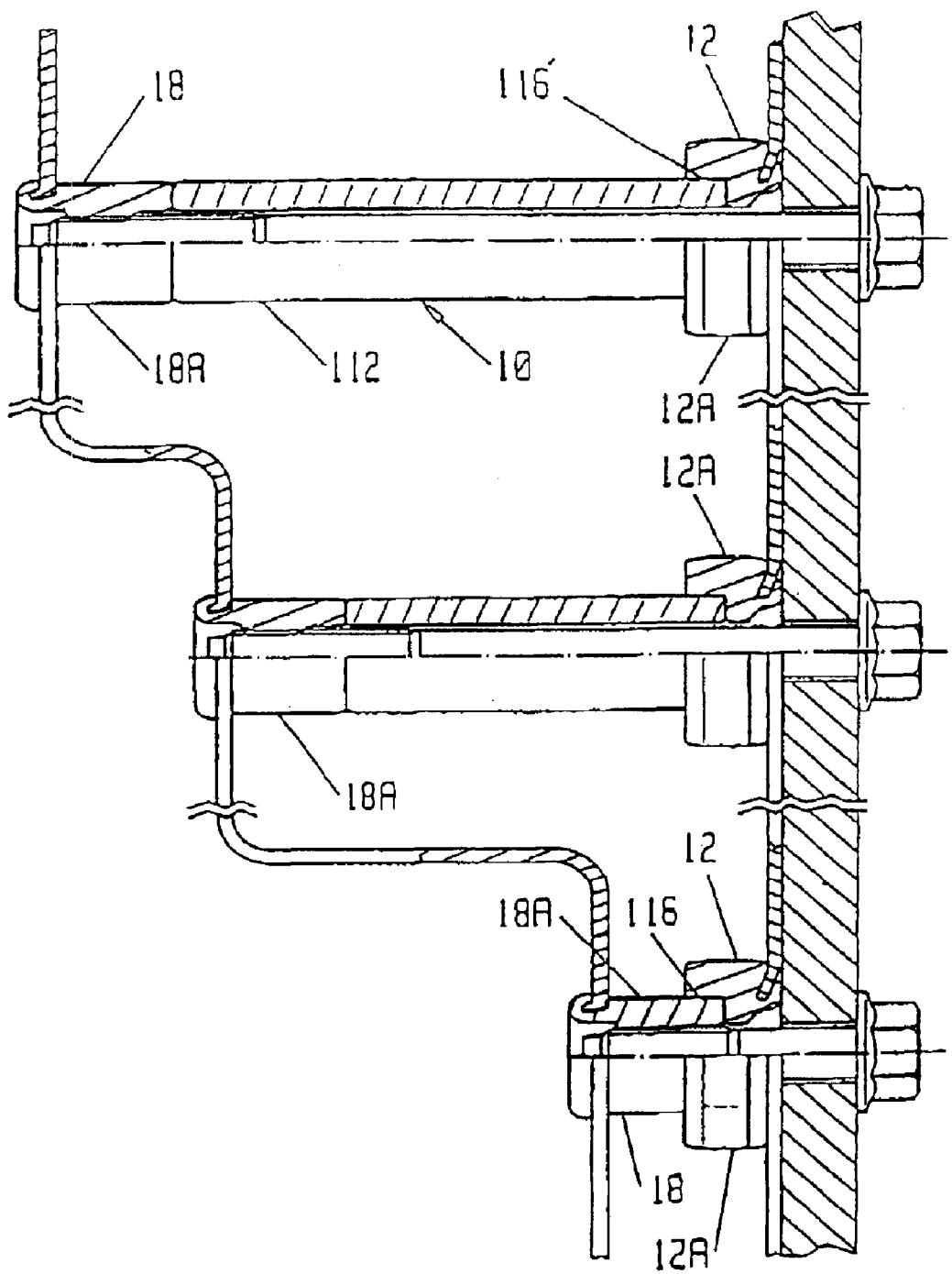

The embodiment in accordance with FIG. 16 is similar to that of FIG. 15, except that here the spacer tube 112 is pressed (optionally adhered) into a cylindrical recess 116 of the element 12A at the end 12 of the fastener device 10, whereby a secure joint is ensured between the spacer tube 112 and the element. A corresponding joint would actually also be possible with the element at the end 18. However, it may be better to omit an interengagement of the two parts here so that a more simple alignment of the two elements is possible when the screw is inserted. The joint between the element at the end 18 and the spacer tube 112 can, however, also be welded in the FIG. 16 embodiment.

In the bottommost embodiment of the fastener device in accordance with the invention of FIG. 16, the end of the element 18A engages with the end 18 of the fastener device directly into the cylindrical recess 116 of the element 12A at the end 12.

Figure 17:
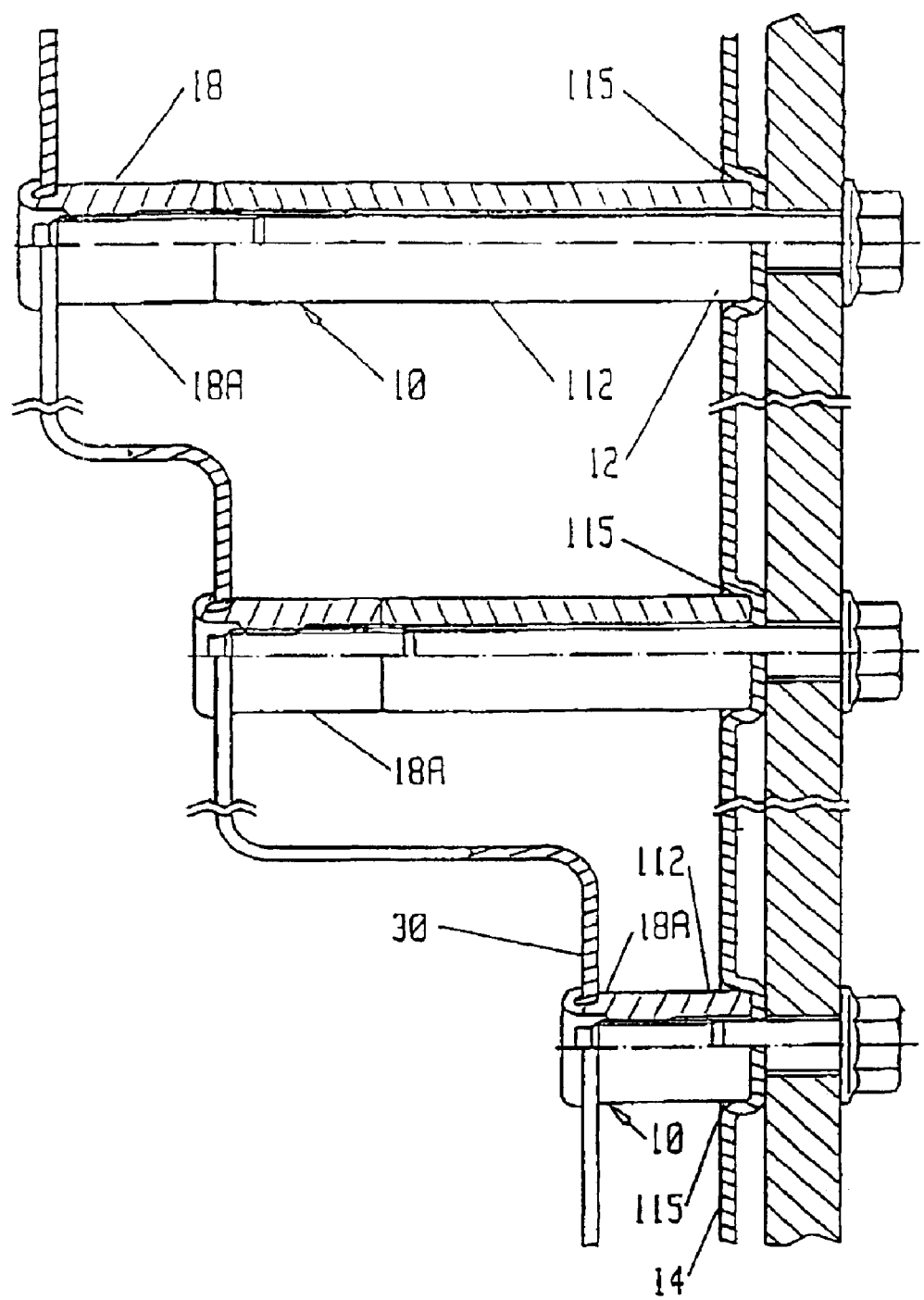

In FIG. 17, the fastener device is made in two parts, with the lower end of the fastener device 10 being formed by the end 12 of the spacer tube 112 and this being received in a cup-like recess 115 in the first component 14 and being capable of being pressed in, bonded or welded there. The joint between the spacer tube 112 and the element at the other end 18 of the fastener device 10 is carried out such as described in connection with FIGS. 15 and 16. In the bottommost embodiment of the fastener device 10 of FIG. 17, the spacer tube 112 is an integral component of the element 18A which is connected by a forming technique to the component 30.

Figure 18:
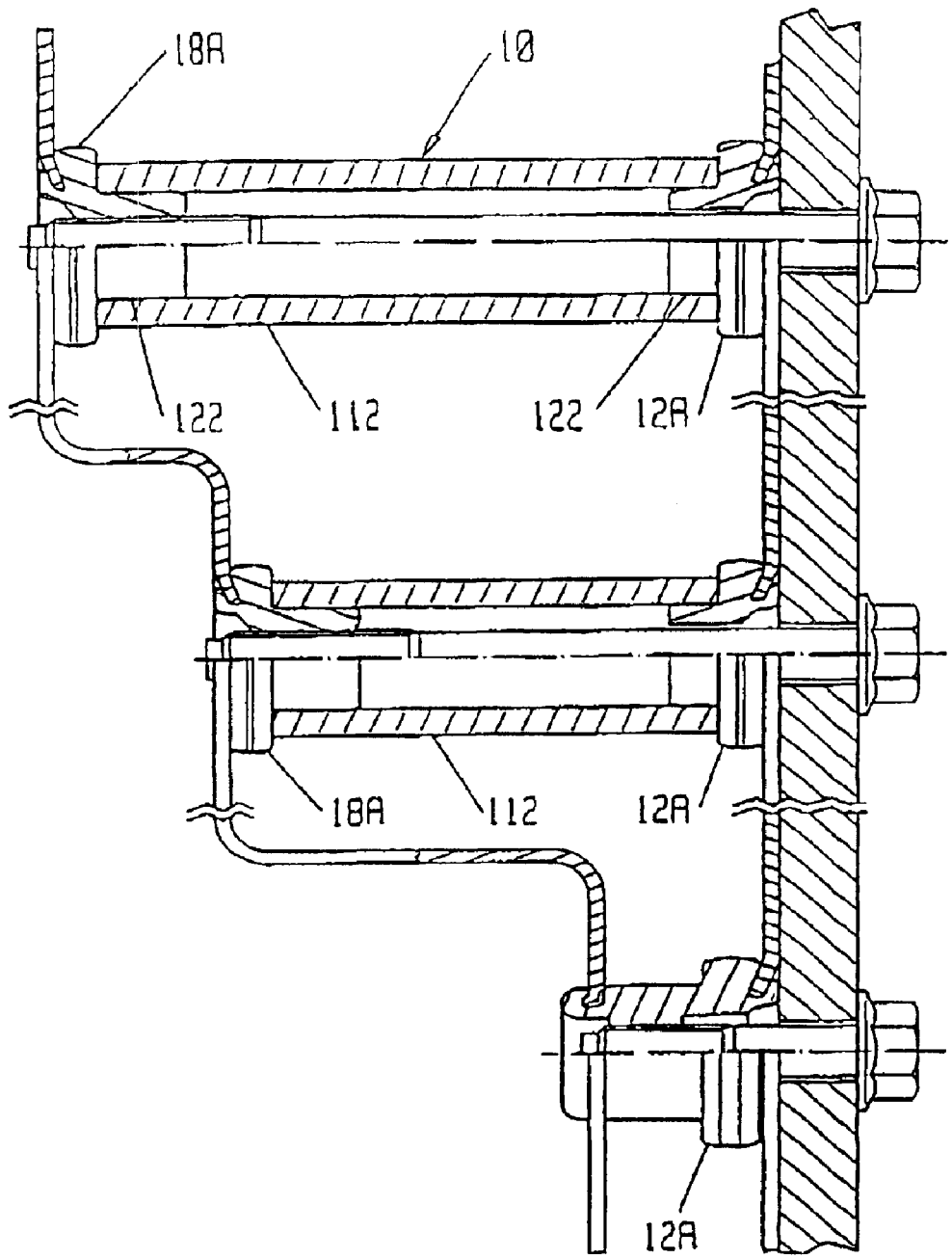

A three-part embodiment of the fastener device 10 is present in FIG. 18. Two identical fastener elements 12A, 18A are used here in the form of RND nut elements from Profil, with a spacer tube 112 being arranged therebetween to make the three-part fastener element 10. In these embodiments, the elements 12A, 18A each have a cylindrical part 122 which is pressed into a respective end of the spacer tube. The joints between the individual elements 12A, 18A and the spacer tube 112 can be selected freely, i.e. for example, with a fit as a force fit, by an adhesive bonding, as a welded joint or as a pinched joint.

Figure 19:
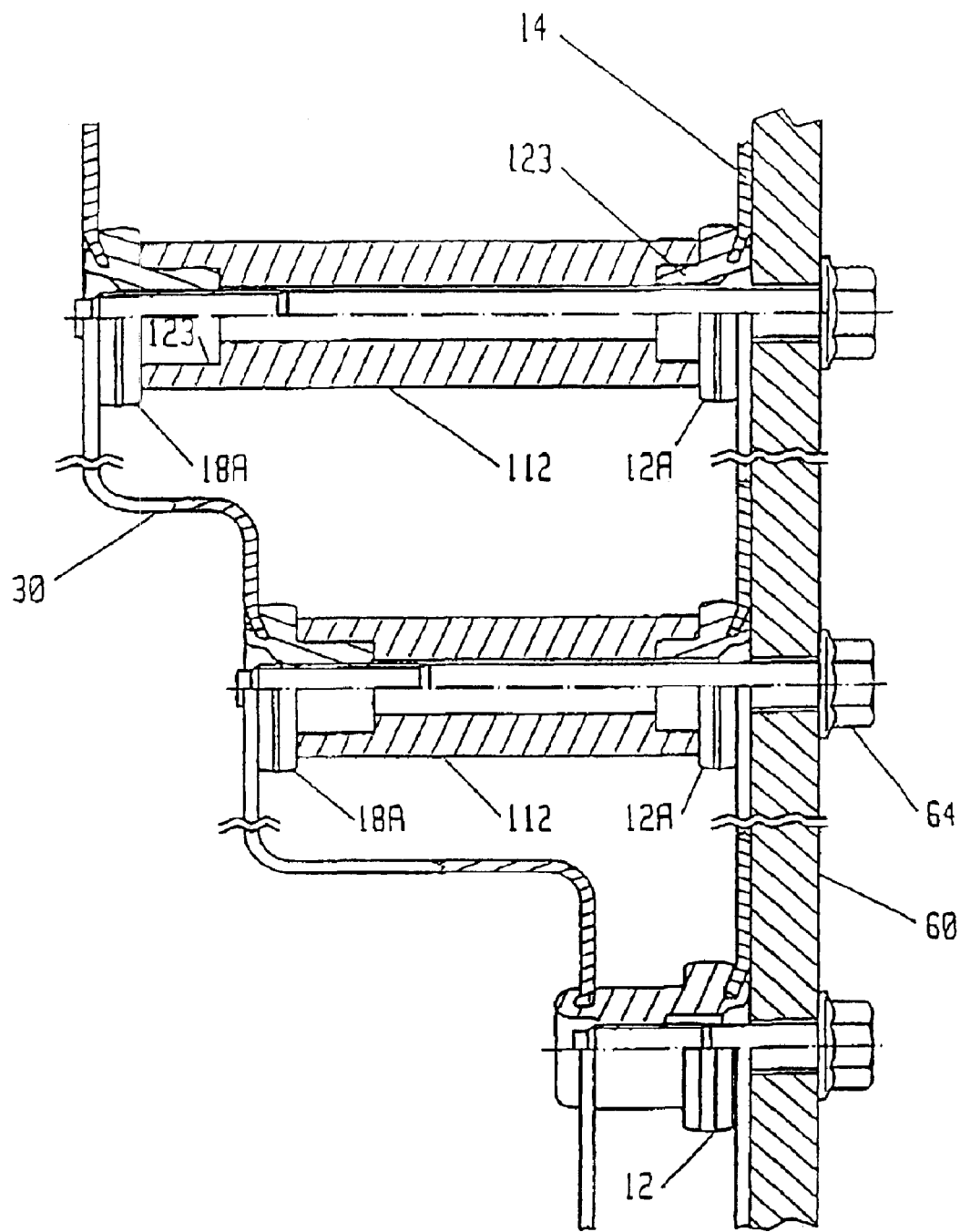

FIG. 19 shows a similar embodiment to FIG. 18, except that here the spacer tube 112 is provided with cylindrical recesses 123 at its two ends so that it is made with a thicker wall at its middle between the two elements than in the embodiment of FIG. 18. The stability is increased even further in this way.

Figure 20:
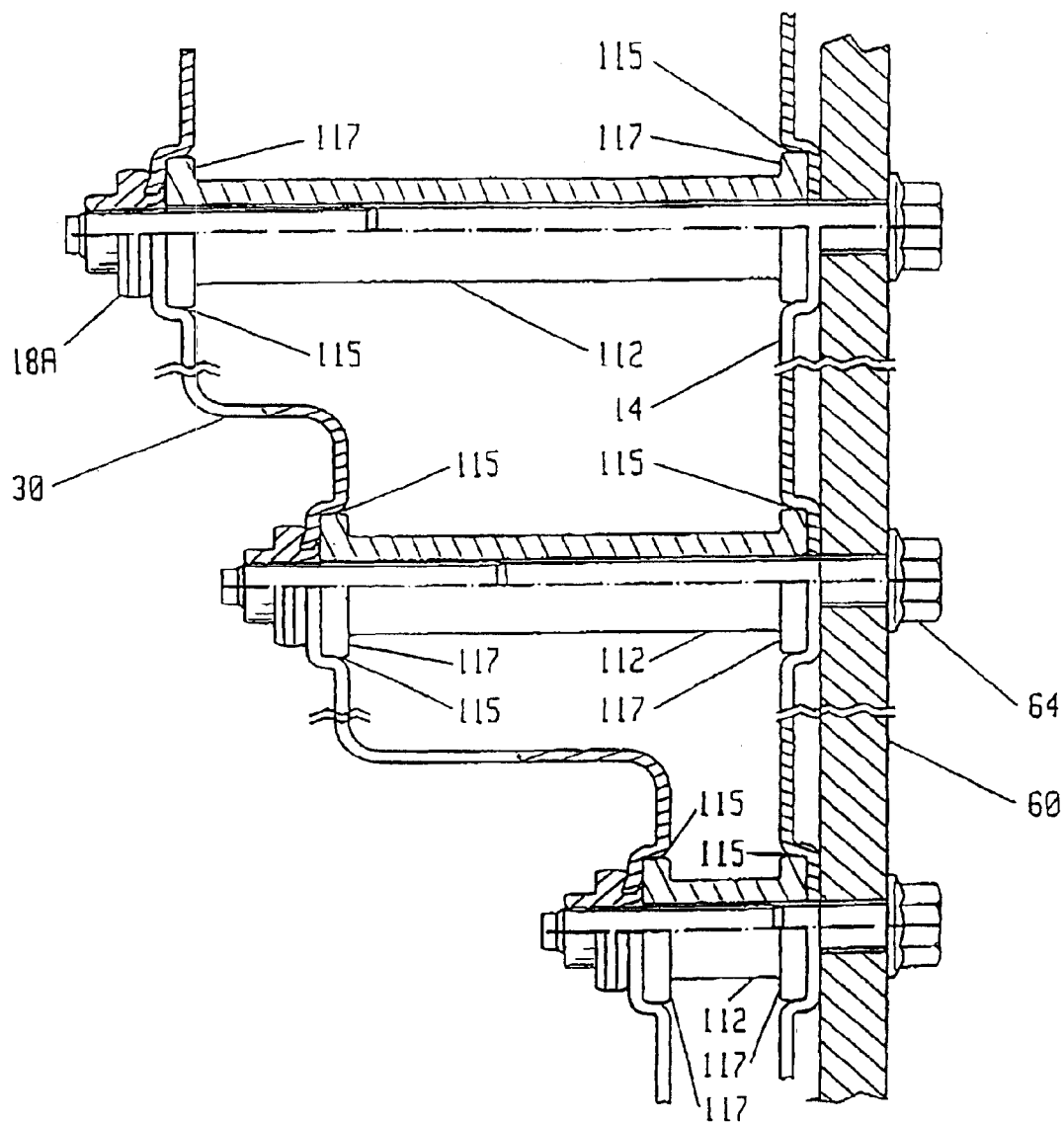

The embodiment in accordance with FIG. 20 is performed while utilizing shaped sheet metal parts 14 and 30 which each have cup-like recesses 115 corresponding to FIG. 17. A multi-part fastener device 10 is also utilized here. It comprises an element 18A made as an RND element and connected in a form-locked manner to the second component 30. The second part of the fastener device 10 consists of a spacer tube 112 having cylindrical annular flanges 117 at its two ends which sit in form-filled manner in the respective cup-like recesses 115. The joints between the ends of the spacer tube 112 and the respective recesses can be made freely, for example as a fit, a force fit or by means of a bond or weld.

Figure 21:
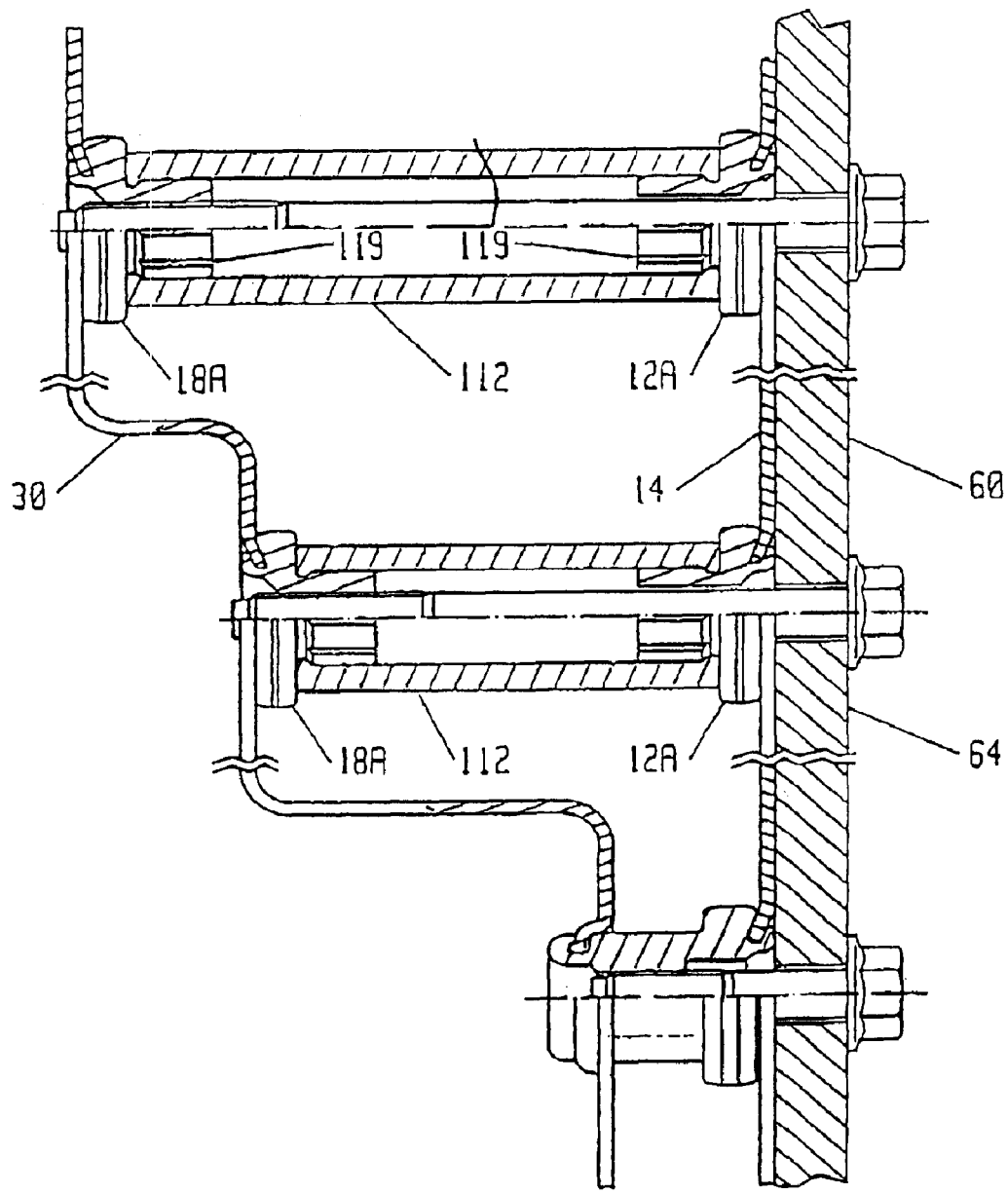

FIG. 21 then shows an embodiment corresponding to the previous FIG. 19, with, however, the two elements being pressed into the respective ends of the spacer tube 112 and this having ribs or grooves 119 extending in an axial direction which serve for rotational security. A radial pinched joint can also be made between the elements and the spacer tube.

FIG. 22 again shows an alternative, three-part embodiment of a fastener device, here while utilizing two circular elements 12A, 18A which each have a flange 130 having a first diameter and a cylindrical part 132 having a smaller diameter than the flange 130. The cylindrical part 132, which has a chamfer 134 at its end remote from the flange 130, is inserted in the component 14 or 30 through a corresponding hole 136 or 138 respectively. The arrangement is made such that the two flanges 130 of the two elements are on opposite sides of the first and second components 14 and 30, the ends 140 of the two elements face one another. The end 140 of the element 18A is provided with a conical recess 141 which is intended as an insertion aid for the tip of a bolt. This type of insertion aid is particularly of importance when the inner diameter of the spacer tube 112 is much greater than the outer diameter of the bolt, as such a difference in diameter involves the risk of the bolt tilting which can be overcome by means of such an insertion aid, optionally with a corresponding design of the free end of the bolt, for example with a conical tip. Another possibility of overcoming this risk of tilting, which makes the insertion of the bolt more difficult or even impossible and could even lead to thread damage, is described below in connection with FIGS. 25A to D. Both the conical inserting aid and the corresponding centering sleeve in accordance with FIGS. 25A to D can be used in all other embodiments where there is a risk of tilting.

A spacer tube 112 having a peripheral annular nose 142 at its two ends is located between the two components 14, 30. The upper element has a thread cylinder 28, the lower element a cylindrical bore 28A whose diameter is somewhat greater than the outer diameter of the thread cylinder 28. The arrangement is pressed together by pressure. During this pressure, the annular noses 142 displace material of the two components 14, 30 so that the displaced material is formed into respective annular grooves 144 of the elements 12A, 18A, whereby a form-locked joint is created between the two components 14 and 30 and the respective elements 12A and 18A. The chamfers 134 make the slipping in of the respective elements into the spacer tube 112 more simple. The cylindrical region 132 has a diameter which is slightly greater than the inner diameter of the spacer tube 112 so that a force fit is created here.

When a third component 60 is attached to the first component 14, a screw element 64 is inserted through the through bore 28A of the first element 12A and screwed together with the thread cylinder 28 of the second element 18A. The screw connection provides additional security of the joint of the three elements to a fastener device 10.

FIG. 23 basically shows the same arrangement as FIG. 22, but it shows that the fastener element can here in inserted in bent regions of the respective sheet metal parts 14 or 30.

FIG. 24 shows a one-piece fastener device 10 similar to FIG. 4, with, however, the two ends of the fastener device being offset with respect to one another, Such an embodiment can sometimes be of help with special installations when particular space restrictions exist. It is also possible to equip the fastener device of FIG. 24 with two thread cylinders 28, 102, with, for example, the thread cylinder 28 at the lower end of the fastener device in FIG. 24 serving the attachment of a third component 60, while the thread cylinder 102 at the upper end of the fastener device can be used for the attachment of an additional part, for example, a brake line fastener.

The drawings of FIGS. 25A to D, finally, show a possible method for the making of a joint in accordance with the invention.

Figure 25A:
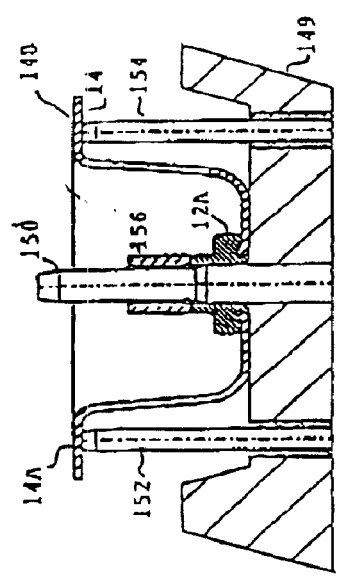

FIG. 25A first shows a first sheet metal part 14 in a tool 149 having a centering mandrel 150. The sheet metal part 14 has a recess U-shaped in cross-section in whose base region a first hollow element corresponding to the middle element 12A of FIG. 18 is fastened by a forming technique. The formation comprising the sheet metal part 14 with the elements 12A is placed over the centering mandrel 150. The two lateral, horizontal regions 14A and 14B are situated on respective welding electrodes 152 and 154 respectively. A loose centering sleeve 156, which is made, for example, of plastic and which can optionally be slit to save weight, is located on the centering mandrel above the element 12A.

Figure 25B:
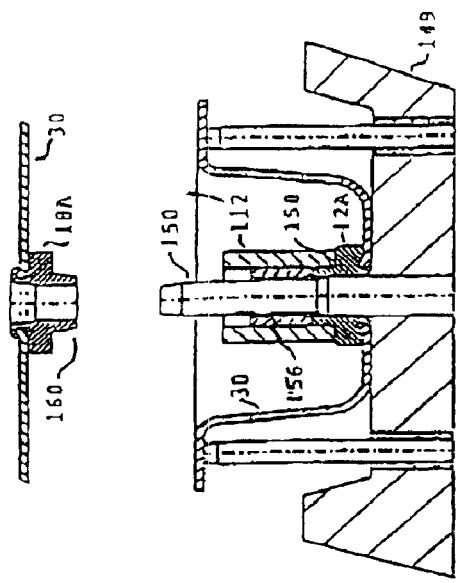
Figure 25C:
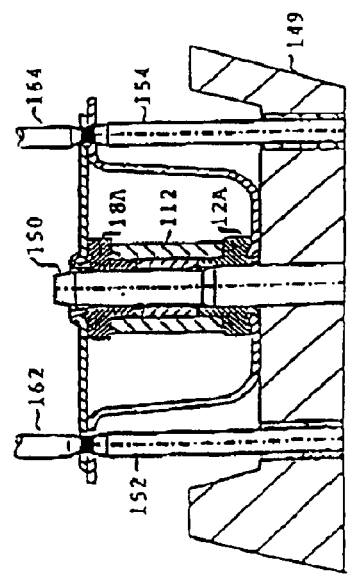
Figure 25D:
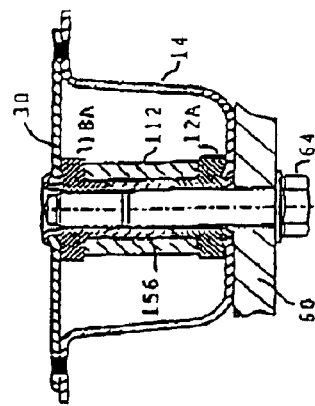

FIG. 25B shows the formation of FIG. 25A, with, however, the spacing tube 112 now being placed over the centering sleeve and being optionally capable of being pressed onto the cylindrical projection 158 of the element 12A if a force fit is present. Alternatively thereto, for example, an adhesive bond or a joint having play could be present. The spacer tube 112 could, however, also be fastened to element 12A by one of the methods given above before its attachment or be welded thereto or formed in a one-piece fashion therewith.

A second sheet metal part 30 is located above the sheet metal part 14 and is provided with a nut element 18A in accordance with FIG. 18, with the element 18A already being riveted to the sheet metal part 30. The assembly part consisting of the nut element 18A and the sheet metal part 30 is now placed in a centered fashion over the sheet metal part 14 and the element 12A with spacer tube 112 while utilizing the centering mandrel. The cylindrical projection 160 of the nut element 18A is optionally pressed or bonded into the free end of the spacer tube or sunk therein with play. The two sheet metal parts are welded together by means of two further welding electrodes 162, 164.

FIG. 25 then shows the completed construction after removal from the tool 149 and after attachment of a component 60 by means of a bolt 64. The centering sleeve 156 prevents the tilting of the bolt 64 during its insertion. Instead of first riveting the element 18A to the sheet metal part 30, the element 18A could first be connected to the spacer tube and then riveted to the sheet metal part. The fastener device comprising the element 12A, the spacer tube 112, the centering sleeve 156 and the element 18A could also be prefabricated as a unit, then riveted to the sheet metal part 18 or 30 and subsequently riveted to the respective other sheet metal part 30 or 18 either before or after its weld fastening to the sheet metal part 18 or 30.

The components are preferably sheet metal parts, but can also be extruded parts or be made of another material, for example, of plastic.

What is claimed is:

1. A method of making a joint between a first and a second component using a fastener having a first end with an adjacent flange having a diameter greater than a first tubular barrel portion and a second end having a second tubular barrel portion merging into a shoulder of a flanged part having a greater diameter than said second tubular barrel portion, characterized by the following steps:

a) making a joint between said first end of said fastener and said first component by deforming said first tubular barrel portion radially outwardly thereby sandwiching said first component between said flange and said first tubular barrel portion;

b) introducing said second end of said fastener through a hole in said second component by applying said second component to said first component, whereby said shoulder of said flanged part abuts said second component spacing said second component from said first component;

c) fastening said fastener to said second component by deforming said second tubular barrel portion radially outwardly thereby sandwiching said second component between said shoulder and said second tubular barrel portion; and d) optionally fixedly attaching said two components at one or more positions remote from the fastener device, with step d) being performable either before or after step c);

wherein step a) comprises piercing said first component with said first end of said fastener.

2. A method of making a joint between a first and second component using a fastener having a first end with an adjacent flange having a diameter greater than a first tubular barrel portion and a second end having a second tubular barrel portion merging into a shoulder of a flanged part having a greater diameter than said second barrel portion, characterized by the following steps:

a) making a joint between said first end of said fastener and said first component by deforming said first tubular barrel portion radially outwardly thereby sandwiching said first component between said flange and said first tubular barrel portion;

b) introducing said second end of said fastener through a hole in said second component by applying said second component to said first component, whereby said shoulder of said flanged part abuts said second component spacing said second component from said first component;

c) fastening said fastener to said second component by deforming said second tubular barrel portion radially outwardly thereby sandwiching said second component between said shoulder and said second tubular barrel portion; and d) optionally fixedly attaching said two components at one or more positions remote from the fastener device, with step d) being performable either before or after step c) wherein said fastener includes a first element being attachable to said first component and a second element being insertable into the second component and adjoining said elements by one of inserting a fastener through said two elements and bolting a threaded shaft of one of said elements to the other of said elements.

3. A method of making a joint between a first and second component using a fastener having a first end with an adjacent flange having a diameter greater than a first tubular barrel portion and a second end having a second tubular barrel portion merging into a shoulder of a flanged pan having a greater diameter than said second barrel portion, characterized by the following steps:

a) making a joint between said first end of said fastener and said first component by deforming said first tubular barrel portion radially outwardly thereby sandwiching said first component between said flange and said first tubular barrel portion;

b) introducing said second end of said fastener through a hole in said second component by applying said second component to said first component, whereby said shoulder of said flanged part abuts said second component spacing said second component from said first component;

c) fastening said fastener to said second component by deforming said second tubular barrel portion radially outwardly thereby sandwiching said second component between said shoulder and said second tubular barrel portion; and d) optionally fixedly attaching said two components at one or more positions remote from the fastener device, with step d) being performable either before or after step c); and wherein step of providing said fastener includes providing a first element component as set forth in step a) and a second element joinable to the second component as set forth in steps b) and c) and a third element insertable between said first and second elements prior to performing step c).

4. A method of supporting panel members in spaced relation and forming a panel assembly, comprising the following steps:

forming an opening in a first of said panel members, inserting a first end portion of a fastener element having an abutment into said panel member opening and clinching said first end of said fastener element to said one of said panel members by deforming a portion of said fastener element radially outwardly over said first of said panel members positioning said panel member between said abutment and said fastener element being deformed radially outwardly;

forming an opening in a second of said of said panel members, and overlaying said second of said panel members upon said first of said panel members thereby coaxially aligning said first opening in said first panel with said second opening in said second panel; inserting a second end of said fastener element having a second shoulder into said opening in said second of said panel members and clinching said second end of said fastener element to said second of said panel members by deforming a portion of said fastener element radially outwardly over said second of said panel members thereby pinching said panel member between said shoulder and said panel member being deformed radially outwardly; wherein said method further includes piercing said opening in said first panel member with said first end of said fastener element.

5. The method of supporting panel members in spaced relation and forming a panel assembly as defined in claim 4, wherein said fastener element first and second end portions are tubular and said fastener element includes a radial flange portion adjacent to one of said tubular end portions but spaced from the other of said tubular end portions, said method including inserting said tubular end portions of said fastener element through said openings in said first and second panel members and clinching said fastener member tubular end portions to said panel members by radially deforming said tubular end portions of said fastener element.

6. A method of supporting panel members in spaced relation and forming a panel assembly, comprising the following steps:

forming an opening in a first of said panel members, inserting a first end portion of a fastener element having an abutment into said panel member opening and clinching said first end of said fastener element to said one of said panel members by deforming a portion of said fastener element at said first end radially outwardly over said first of said panel members positioning said panel member between said abutment and said portion of said fastener element at said first end being deformed radially outwardly;

forming an opening in a second of said panel members, and overlying said second of said panel members upon said first of said panel members thereby coaxially aligning said first opening in said first panel with said second opening in said second panel; inserting a second end of said fastener element having a second shoulder into said opening in said second of said panel members and clinching said second end of said fastener element to said second of said panel members by deforming a portion of said fastener element at said second end radially outwardly over said second of said panel members thereby pinching said panel member between said shoulder and said portion of said fastener element at said second end being deformed radially outwardly;

wherein said fastener element comprises a plurality of parts including a first female fastener element, a second female fastener element and tubular spacer element, said first female fastener element including said first end portion of said fastener element and said second female fastener element including said second end portion of said fastener element and said female fastener elements having a bore therethrough, said method including the following steps;

inserting said first end portion of said first female fastener element in said opening in said one of said panel members and clinching said first end portion;

securing said tubular spacer element to said first female fastener element generally coaxially aligned with said bore through said first female fastener element;

inserting said second end portion of said second female element through said opening through said second of said panel members and clinching said second female fastener element to said second of said panel members; and securing a second end of said tubular spacer member to said second female fastener element generally coaxially aligned with said bore through said second female fastener element.

* * * * *